Figure 1:
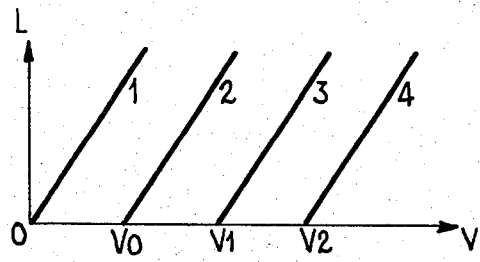

United States Patent [19]

Galves et al.

[11] 3,911,310

[45] Oct. 7, 1975

[54] PLURAL PHOSPHOR LAYER SCREEN

[75] Inventors: Jean-Pierre Galves; Paul-Louis Trotta, both of Paris, France

[73] Assignee: Thomson-CSF, Paris, France

[22] Filed: Nov. 18, 1970

[21] Appl. No.: 90,611

[30] Foreign Application Priority Data
Nov. 25, 1969 France .............................. 69.40588

[52] U.S. Cl................................. 313/473; 313/466
[51] Int. Cl.² ..................... H01J 29/26; H01J 29/30
[58] Field of Search ................................ 313/92 PF

[56] References Cited
UNITED STATES PATENTS

| | | | |
|---|---|---|---|
| 2,423,830 | 7/1947 | Fonda | 313/92 PF |
| 2,440,301 | 4/1948 | Sharpe | 313/92 PF X |
| 2,452,522 | 10/1948 | Leverenz | 313/92 PF |
| 3,242,260 | 3/1966 | Cooper et al. | 313/92 PF X |
| 3,294,569 | 12/1966 | Messineo et al. | 313/92 PH |
| 3,522,463 | 8/1970 | Bishop | 313/92 R |
| 3,651,362 | 3/1972 | Takita | 313/92 R |

Primary Examiner—Robert Segal
Attorney, Agent, or Firm—Cushman, Darby & Cushman

[57] ABSTRACT

A cathode ray tube screen comprising a luminescent layer formed by two kinds of phosphors in predetermined proportions, one exhibiting persistence and the other not exhibiting persistence. The persistent phosphors are associated with a barrier material, which is not luminescent under electron bombardment and requires a predetermined accelerating voltage for the electron to pass therethrough. The barrier material either encloses the persistent phosphors, which then form a mixture with the non persistent phosphors, or is deposited as a layer between a layer of non persistent phosphors exposed to the incident electron beam and a layer of persistent phosphors.

1 Claim, 5 Drawing Figures

PLURAL PHOSPHOR LAYER SCREEN

The present invention relates to screens for cathode-ray tubes.

Since such tubes are well known, no general description of cathode-ray tubes, such as, for example, oscilloscopes, need be given here.

It will be merely recalled that oscilloscopes comprise one or more electron-guns, located at one of the two ends of the tube, and a screen covered with a luminescent material, i.e. capable of emitting luminous radiation under the effect of bombardment by electrons from the guns, which are accelerated by a high voltage towards the screen.

Depending upon the composition of the luminescent material, the trace obtained on the screen under the electron impact may or may not exhibit persistence, i.e. may or may not remain on the screen for a certain time after the impact of the electrons thereupon.

Known screens either exhibit no persistance at all or have some specific degree of persistence.

It is an object of this invention to provide a cathode-ray tube screen capable of exhibiting no persistance or a persistance of variable duration.

By the term "variable duration persistance" or simply "variable persistance," it is intended to convey the idea of persistance of variable duration, the duration in question being the time taken by the luminosity of the persisting trace to drop to a certain fraction of its initial value, say 10 percent.

This duration is directly linked with the initial luminosity of the trace, the time taken by a persistent trace to decay to a given fraction of its initial luminosity being in direct ratio with the initial luminosity and the decay in the luminosity generally taking place in accordance with a fixed exponential law for a given persistent material.

Thus, the persistence time and the initial luminosity of the trace are inseparable factors.

This luminosity depends upon the energy of the incident electrons, that is to say upon the accelerating voltage applied to the screen, which voltage will have to be considered in the following.

According to the invention there is provided a luminescent screen for cathode ray tubes capable of emitting light under the impact of electrons, comprising : a transparent support, first phosphors capable of persistence and second phosphors not capable of persistence covering said support, and a non luminescent material associated with said first phosphors for preventing them from emitting luminous radiation as long as the energy of the electrons impinging thereupon is lower than a predetermined energy.

Figure 2:
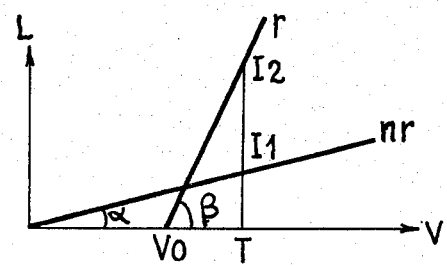
Figure 4:
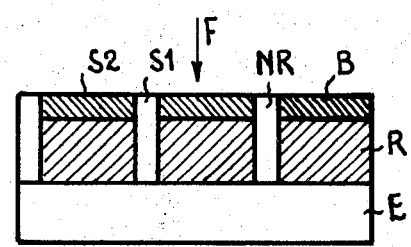
Figure 3:
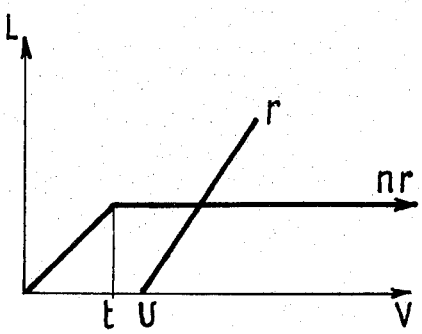
Figure 5:
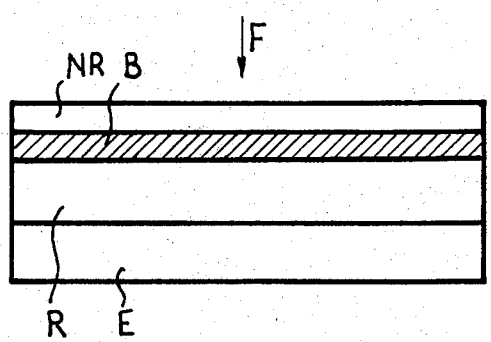

For a better understanding of the invention and to show how the same may be carried into effect, reference will be made to the drawing accompanying the ensuing description and in which:

FIGS. 1, 2 and 3 illustrate explanatory diagrams relating to the operation of the screens in accordance with the invention; and FIGS. 4 and 5 schematically illustrate in section two embodiments of screens in accordance with the invention.

The invention is based upon the use, for forming screens of cathode-ray tubes, in addition to luminescent products either persistent or not, of an inert material which, while being permeable to electron bombardment, is not luminescent.

Materials of this kind absorb the bombardment energy of the electrons impinging thereupon and this energy absorption is generally proportional to the square root of their thickness.

A material of this kind, deposited upon a luminescent material, will therefore delay the appearance of the luminescence in same, and this luminescence will appear only when the accelerating voltage is higher than that necessary for the electrons to pass through the layer of the inert material. For this reason, this kind of material is referred to as a barrier or retardation material.

Beyond this accelerating voltage value, the luminosity of the radiation emitted under the effect of electron bombardment by the luminescent product will rise very rapidly with the bombardment voltage, as the diagram of FIG. 1 shows. In the latter, the luminosity L of a surface covered with a given density i.e. with a given amount of the luminescent product per surface unity, is plotted as a function of the bombardment voltage V for different degrees of thickness of retardation material. This thickness is zero in the case of the curve 1 and rises progressively for curves 2 to 4, which correspond respectively to the voltages $V_0$, $V_1$ and $V_2$ at which the luminescent products starts to produce light. The luminosity L is, roughly speaking, a high power of the quantity V-v, where V designates the acceleration voltage and v the voltage required for the electrons to pass through the retardation material, and L has therefore been illustrated by rough approximation in the form of straight lines, steeply inclined in relation to the V axis.

In accordance with the invention, the retardation material is applied only to the product exhibiting the persistence effect. The screen in accordance with the invention thus essentially comprises two luminescent products, generally of crystalline nature, or "phosphors" i.e. phosphors NR exhibiting no persistence and phosphors R exhibiting persistence and covered with a layer of retardation material under conditions which will be set out more particularly hereinafter.

Two embodiments of the screen according to the invention have been given hereinbelow by way of non-limitative examples: 1st example (FIG. 4):

Using one of the known methods, there is deposited upon a substrate E, such as for example glass, (this glass is for example that of the wall of the tube), a layer some few microns thick of a mixture in predetermined proportions of phosphors not exhibiting persistence and of phosphors exhibiting persistence, these latter being embedded in an inert material which ensures that, in the presence of electron bombardment, the aforedescribed retardation effect is achieved. The said proportions are selected as a function of the desired persistence degree.

FIG. 4 shows in a somewhat symbolic manner, with a view to facilitating understanding, non-persistence phosphors NR and persistence phosphors R in the form of separate strips, although in reality they are intimately mixed in the body of the continuous layer covering the screen E. In the same figure, the retardation material has been represented by a layer B covering the persistence phosphors at the side at which electron bombardment (represented by the arrow F) takes place. $S_1$ and $S_2$ designate the widths of the strips NR and R, while in fact $S_1$ and $S_2$ represent the respective quantities of crystals of the phosphors NR and of phosphors R, in the continuous layer covering the screen support E.

The diagram shown in FIG. 2 explains the behaviour of the screen of FIG. 4 under electron bombardment. In this diagram, nr and r represent the luminosity of phosphors NR and R respectively. The measurement of this luminosity is particularly easy in the case of two luminescent products exhibiting different light spectra; these luminosities are then separately measured by successively placing in front of the screen color filters respectively corresponding to the light spectrum of each of the two products. The luminosity is substantially proportional to the quantity of the phosphors which are contained in the layer covering the substrat E ; this explains the difference in slope of the straight lines nr and r, whose slopes $\alpha$ and $\beta$ are proportional to:

$$\frac{S_1}{S_1 + S_2} \text{ and } \frac{S_2}{S_1 + S_2}$$

$S_2$ has deliberately been made much greater than $S_1$ in order that the fraction of the total light energy which persists on the screen after the disappearance of the non-persistent trace, is close to 1.

At the initial instant, the total luminosity of the image obtained on the screen is the sum of the respective luminosities of the two traces, the non-persistent and the persistent one, since the non-persistent trace is present on the screen at this instant. However, the non-persistent trace then disappears virtually instantaneously whilst the persistent trace takes a certain time to decay in accordance with the exponential law referred to hereinbefore.

Since, on the other hand, the persistence time is measured by the time which it takes for the luminosity of the persistent trace (the only one now present on the screen) to decay to no more than a predetermined fraction of the initial luminosity, it will be appreciated that this time depends on the proportion of the luminosity of the non-persistent trace in the initial total luminosity, that is to say on the ratio $$\frac{Tl_1}{Tl_2}$$

in FIG. 2. The larger this proportion, the shorter the time taken for the luminosity of the persistent image to decay to a given fraction of the initial luminosity.

The persistence time will depend, therefore, on the proportion of non-persistent product in the mixture.

For any bombardment voltage lower than $V_0$ (FIG. 2), the only trace recorded on the screen will be a non-persistent trace since only the non-persistent layer NR is excited, while above this value (it defines the voltage necessary for the electrons to pass right through the barrier layer) the persistent trace will appear in its turn; the respective luminosities of these traces are in the proportion of the segments $Tl_1$ and $Tl_2$ when the accelerating voltage is equal to T.

The more the accelerating voltage V increases, the smaller is the part of the luminosity of the non-persistent trace in the initial total luminosity and the longer is the time for which the luminosity of the persistent trace will remain, whilst decaying, greater than above predetermined fraction of the initial luminosity.

In order to increase the persistence time of screens in accordance with the invention, other things being equal, the voltage V applied to the screen will have to be increased. 2nd example (FIG. 5):

Still using prior art techniques, there are successively deposited upon the screen substrate E, a layer of persistent luminescent material R, some microns thick, a barrier layer B aproxilately 0.5 $\mu$ thick, and a very fine layer, 0.5 to 1 $\mu$ thick, of non-persistent phosphors NR. A screen of this kind, under electron bombardment, produces traces whose luminosity L as a function of the accelerating voltage V is illustrated by the diagram of FIG. 3. In this case, however, the non-persistent very fine layer first encountered, is saturated (horizontal part of the broken line nr) that is to say that its luminosity does not increase any further as the bombardment voltage V rises, before the persistent layer starts to produce light; this is because, before this latter layer can produce any light, a bombardment voltage equal to that required to pass through the whole of the non-persistent layer NR plus the voltage required to pass the barrier layer B, is needed. The voltage required to produce luminescence in the persistent layer has in this case been marked U and the voltage at which saturation of the non-persistent layer takes place, has been marked t.

A current value of the voltage $V_0$ is 5 kV, the operating voltage (T for example in the diagram of FIG. 2), being somewhere between 8 and 20 kV depending upon the desired luminous intensity in the persistent trace.

The luminescent products employed in the invention are known zinc-sulphide based materials, or other known phosphors. For instance, the persistent phosphors (R) may comprise magnesium fluoride, manganese activated; or zinc sulfide, silver or copper activated; or zinc silicate, manganese or arsenic activated. The non-persistent phorphos (NR) may comprise zinc cadium sulfide, silvler activated; or yttrium vanadate, europium activated as will be apparent to those in the art. The retardation material is generally silica or any other material which is not photoemissive when bombarded by electrons such as: alumina, silica, silicates, magnesia or refractory oxides as will be apparent to those in the art. The deposition of the layer of inert material B (FIG. 5) or the embedding in the inert material of the phosphors exhibiting persistence prior to use, as in the case of the screen FIG. 4, are effected by methods well known to those skilled in the art, namely chemical deposition, vaporization under vacuum etc.

It ought also to be pointed out that by choosing persistent or non-persistent phosphors material which do not have the same emitted light spectra, the invention makes it possible to produce a two-color tube.

Of course, the invention is not limited to the embodiments described and shown, which were given solely by way of example.

What is claimed is:

1. A luminescent screen for cathode ray tubes which screen exhibits variable persistence when excited with electrons of correspondingly variable energies said screen comprising:

a transparent support and, a coating disposed on the side of said support adapted for bombardment by said electrons, said coating comprising:

first phosphor means disposed for direct bombardment by said electrons to produce a luminous non-persistent radiation in response thereto, second phosphor means constituting a different material than said first phosphor means, said second phosphor means emitting a luminous persistant radiation in response to excitation by electrons and being provided in a larger quantity than said first phosphor means, and a non-luminescent material means shielding said second phosphor means from said electrons, said non-luminescent material means absorbing said electrons when their energy is lower than a predetermined value which value depends upon the thickness of said non-luminescent material, and said non-luminescent material means transmitting said electrons therethrough to excite said second phosphor means when the incident electron energy is higher than said predetermined value, wherein said second phosphor means is embedded in said non-lluminescent material means and the thus embedded second phosphor means is mixed with said first phosphor means thus forming a continuous layer coating said support.

* * * * *